(12) United States Patent
Fellinger et al.

(10) Patent No.: US 8,086,794 B2
(45) Date of Patent: Dec. 27, 2011

(54) SYSTEM AND METHOD FOR DATA MIGRATION BETWEEN COMPUTER CLUSTER ARCHITECTURE AND DATA STORAGE DEVICES

(75) Inventors: David F. Fellinger, Westlake Village, CA (US); Michael J. Piszczek, Laurel, MD (US); Charles Dwain Cole, Jr., Columbia, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 529 days.

(21) Appl. No.: 12/333,769

(22) Filed: Dec. 12, 2008

(65) Prior Publication Data
US 2010/0153634 A1   Jun. 17, 2010

(51) Int. Cl.
*G06F 12/00* (2006.01)

(52) U.S. Cl. ........ 711/114; 711/103; 711/117; 711/162; 711/165; 711/170

(58) Field of Classification Search .................. None
See application file for complete search history.

*Primary Examiner* — Shawn X Gu
(74) *Attorney, Agent, or Firm* — Rosenberg, Klein & Lee

(57) ABSTRACT

A system for data migration between a compute cluster and disk drives by inclusion of a buffer node coupled to the compute cluster to store data received therefrom in a random fashion. The buffer node signals the computer nodes to promptly return from the I/O cycle to the computing state to improve the duty cycle of the device. The system further includes a storage controller which is coupled between the buffer node and the disk drives to schedule data transfer activity between them. The data transfers are actuated in the sequence determined based on minimization of seeking time and tier usage, and harvest priority, when the buffer node either reaches a predetermined storage space minimal level or a predetermined time has elapsed since the previous I/O cycle. The storage controller deactivates the disk drives which are not needed for the data transfer.

39 Claims, 7 Drawing Sheets

SYSTEM AND METHOD FOR DATA MIGRATION BETWEEN COMPUTER CLUSTER ARCHITECTURE AND DATA STORAGE DEVICES

FIELD OF THE INVENTION

The present invention is directed to data migration between high performance computer cluster architectures and storage devices.

More in particular, the present invention is directed to a system for data migration between high performance computer clusters and disk drives in which the data writing on the disk drive(s) is independent of the data transfer from the computer cluster that is accomplished by providing an intermediate data storage layer coupled to the computer cluster which is capable of high speed random access data storage from the computer clusters while the disk drives may "pull" the data stored on the intermediate data storage layer in an optimal organized fashion thereby attaining a highly efficient use of the disk drives, minimized "seek" time, and bandwidth advantages. When data is stored in the intermediate data storage layer, the computer cluster is immediately ordered to return from the I/O state thereof (when the data transfer takes place) to the computing state, thereby maximizing the duty cycle of the computer cluster.

In overall concept the present invention is directed to a system and method for storing data generated by the computer cluster on the disk drives in which a data storage management system is provided which communicates with an intermediate data storage layer which "holds" pending data transfer received from the computer cluster to sort the list of pending data transfers and to effectively harvest the pending data transfers from the intermediate data storage layer in an orderly fashion, to minimize the "seeking" time. This scheme allows for the orderly data transfers to the disk drives, thereby permitting the avoidance of the usage of excessive number of disk drives necessary in random data transfers to the disk drives, and thus attaining power savings for the disk drive. Those disk drives which are not used for the scheduled data transfers, are deactivated as being unneeded for the data transaction, thereby even further reducing the power consumption in the multi-disks environment of the system in question.

The present invention is also directed to a system and method for storing "checkpoint" data produced by high performance computer cluster architecture in which the powering of disk drives is minimized, wherein the seeking time (disk drive head movement) is diminished by allowing an orderly scheduling of the writing data transfers on the disk drives, and wherein the I/O cycle of the computer clusters for "flushing out" the "checkpoint" data is substantially shortened.

BACKGROUND OF THE INVENTION

Compute clusters, or groups of linked computers, have been broadly utilized to improve performance over that provided by a single computer, especially in complex computations, for example, to execute simulations of complex physical phenomena. As shown in FIG. 1 (PRIOR ART), the elements of the computer cluster, such as computer nodes 10, are linked by a high speed network 12 allowing the sharing of compute resources and memory. Data transfers to or from the cluster elements are performed through the high speed network 12 and are managed by additional compute devices, referred to herein as data servers 14. The computer cluster may assume either the compute state (cycle) or the I/O state (cycle), which are typically mutually exclusive. The process of moving data is carried out during the I/O (input/output) cycle of the computer nodes 10, e.g. the data transfers are executed during a time interval when the compute activity has ceased.

In general, simulations of physical phenomena, and other complex computations, may run for an extended period of time lasting, for example, hours or days. During the execution of a simulation, "checkpoint" data is written into the program so that, if the application software or hardware should fail, it is possible to restore the simulation from the "checkpoint". This "checkpoint" changes the state of the computer cluster from compute state to I/O state (cycle), so that the cache of the compute nodes 10 are written to the attached servers 14 which place the data in an orderly file system for subsequent retrieval. Since in the I/O cycle no actual computation occurs, it is important to keep the I/O cycle as short as possible to maximize the overall compute duty cycle of the computer cluster.

The ratio of compute elements to servers is often very large and may exceed 1000 in some implementations. The servers file data from multiple computer nodes and assign a unique location for each computer node in the overall file system. Typically, the data is stored on rotating media such as common disk drives 16.

Since multiple compute devices may require access to the servers at the same time, the effective data accesses appear to be largely random as the servers satisfy the requests of the compute devices in the order that the requests are received. Disk drives operate in this scheme as "push" devices, and must store the data on demand. Disk drives do not perform well in satisfying random requests since the heads that record the data have to be moved to various sectors of the drive and this movement takes a great deal of time compared to the actual write or read operation. To "work around" this problem, a large number of disk drives may be utilized that may be accessed by a control system 18 which then schedules disk operations in the attempt to spread the random activity over a large number of disk drives to diminish the effects of disk head movement, aka "seeking".

The size of compute clusters and the aggregate I/O bandwidths that must be supported may require thousands of disk drives for the control architecture to minimize the duration of the I/O cycle. Even though thousands of disk drives are usually powered to support data transfers, the I/O activity itself occupies only a short period of the overall "active" time of the disk system. Even though the duty cycle of write activity may occupy, for example, less than 10% of the clusters total operational time, all the disk drives nevertheless are powered in expectation of this activity.

It would therefore be beneficial to provide a data migrating technique between the compute cluster architecture and the disk drives in which a reduced number of disk drives is needed for data storage, wherein the shortened I/O cycle of the high performance compute cluster architecture may be attained, and wherein the effective aggregate I/O bandwidths of the disk drive operation may be provided without excessive power consumption.

SUMMARY OF THE INVENTION

It is therefore an object of the present invention to provide a system in which data migrates between high performance computer clusters and data storage devices in an efficient manner, and wherein the improved duty cycle of the computer clusters may be attained without excessive power consumption for powering the disk drives.

It is a further object of the present invention to provide a system in which the effective data migration between the compute clusters and the disk drives may be reached by scheduling sequential data writing on a designated disk drive independent of the I/O cycle of the computer clusters operation.

It is another object of the present invention to provide an intermediate data storage layer operatively coupled to the computer clusters and capable of high speed random access storage of the data received therefrom in their I/O state, and responsive thereto, generating a signal to the computer clusters to return their operation to the compute mode immediately after the data is stored in the intermediate data storage layer. The writing of the data from the intermediate data storage layer on the disk drives is performed independently of the I/O cycle of the compute cluster by subsequently harvesting the intermediate data storage layer when the intermediate data storage layer is full.

It is still a further object of the present invention to provide a data migrating system in which a data storage management system is coupled between an intermediate data storage layer "holding" pending data transactions stored therein, and wherein the data storage management system determines the optimal sequence of the pending data transfer to the data disk drives, and actuates the orderly data transfer in the most effective fashion calculated by the storage management system based on the harvest priority, minimization of disk seeking and tier usage.

The present invention also provides a system with an improved duty cycle, increased effective bandwidth, and minimized power consumption for data migration between a data generating entity (computer node), in the I/O cycle thereof, and a plurality of data storage units (disk drives). The system comprises:

an intermediate data storage layer (buffer node) operatively coupled to the data generating entity to store data received therefrom in the 1/O cycle thereof, and produces a "return" signal to the computer node to switch the same to the "compute" state of operation substantially immediately upon the data has been stored in the buffer node.

The data stored in the buffer node may "wait" for some time prior to being "harvested" therefrom for writing on the disk drive, while the computer node returns to its "compute" cycle immediately upon the data has been stored in the buffer node. This approach dramatically improves the duty cycle of the computer cluster.

The system further utilizes a data storage management system (including storage controller) operatively coupled between the buffer node and the plurality of disk drives to schedule data transfer activity therebetween. The management system includes a storage controller which, when the buffer node approaches the predetermined "fullness" or capacity thereof, sorts the pending data transfer in the buffer node, and determines an optimal sequence of data harvesting from the buffer node based on several criteria, including: harvest priority, tier usage minimization, and disk seeking time minimization. When a disk drive is appointed for receiving the data, the data storage management system actuates the data transfer from the buffer node to the designated disk drive in the optimal sequence, while the other disk drives which are not needed for the data transfers are deactivated thereby providing a tremendous power saving.

The buffer node and the data storage management system interactively operate under the control of a management software designed specifically for the purpose of permitting the orderly writing of data on the disk drives in the most effective manner.

In a particular application of the system in question, as an example, the "checkpoint" data may be transferred to the buffer node from computer nodes responsive to a "transfer" command issued by the buffer node in response to a "write" request generated by the respective computer node, if the buffer node can allocate a storage space thereat for the "checkpoint" data.

The buffer node stores the data in a non-volatile random access memory (NVRAM), and operates in accordance with the algorithm underlying the management software which may be executed by a processing unit in the buffer node for controlling the operation of the buffer node. The storage controller also has a processing unit for processing a relevant portion of the management software.

The NVRAM may be implemented as NAND storage elements, battery backed static memory elements, or carbon nanotube memory, etc.

The buffer node maintains a file descriptor including an address of a specific file in the NVRAM, and updates the file description upon the "checkpoint" data, or any other intended data stored in the NVRAM. Additionally, the buffer node maintains a timer to determine an elapsed time since the last input to or output from the NVRAM, as well as to determine the end of a previous I/O cycle of the respective computer node and the beginning of the next I/O cycle. The timing readings are considered by the storage controller when sorting the data transfer pending in the buffer node.

The storage controller is coupled to the buffer node to harvest the data stored therein in a controlled manner. The buffer node controls the timing of each harvest request. Additionally, the storage controller may selectively throttle the harvest for the buffer node to limit concurrent access to a plurality of the disk drives.

The buffer node receives the raw data from the computer node and uses an internal file system to track the received data. This information is used by the storage controller to sort the requests.

The buffer node communicates "write update" messages to the storage controller when the "write" request is received from a computer node, but no data transfer is allowed from the buffer node to the disk drive until the "harvest" request is issued by the buffer node to the storage controller, when a remaining space in the NVRAM reaches a predetermined minimal level, or when a predetermined time elapses since a previous "harvest" event.

Upon the receipt of the "harvest" requests from the buffer node, the storage controller initiates a sorting operation of "write update" messages received from the buffer node, generates an optimal sequence of data transfers, and sends corresponding "read" requests to the buffer node to transfer the data from the NVRAM to a designated disk drive in accordance with said optimal sequence of data transfers.

The present system, in addition to the migration of the data from the computer node towards the disk drives, also permits an opposite process, e.g. obtaining the data stored in the system for the computer node use. To "read" the needed data, the computer node generates a "file read" request to the buffer node to read the data from the NVRAM, responsive to which the buffer node transfers the data to the respective computer node if the data remains in the NVRAM. Otherwise, the buffer node commands the storage controller to acquire the requested data from the disk drive storing the data and sending the data to the buffer node.

The present invention also constitutes a method for data transfer between data generating entity (computer node) and data storage devices (disk drives).

The method in question comprises the following steps:
operatively coupling a buffer node to the computer node and operatively connecting a storage controller between the buffer node and the disk drives;
sending data, for example, "checkpoint" data, from the computer node to the buffer node during an I/O cycle of the computer node.
signaling the storage controller that the buffer node has stored the "checkpoint" data in a non-volatile media memory thereof;
sending a "harvest" request from the buffer node to the storage controller;
sorting a list of "checkpoint" data stored in the buffer node for writing the "checkpoint" data to the disk drives in an optimal data transfer sequence;
periodically harvesting the "checkpoint" data from the buffer node according to the sorted list; and
sequentially writing the "checkpoint" data to a designated disk drive in the optimal sequence.

The harvesting of the "checkpoint" data from the buffer node is conducted in accordance to a predetermined time elapsed since a previous harvest, and/or if a free space on the non-volatile media memory in the buffer node falls below a predetermined threshold.

In order to send the "checkpoint" data to the buffer node, the method contemplates the steps of:
issuing a "write" request by the computer node to the buffer node,
searching for a storage space in the non-volatile media memory for the "checkpoint" data, and
generating a "transfer" command at the buffer node responsive to the "Write" request if the storage space has been allocated.

Upon the data being stored in the buffer node, a "return" signal is issued at the buffer node to terminate the I/O cycle of the computer node and to switch the computer node from the I/O cycle to the computing state.

The disk drives which are not needed for the storing of the "checkpoint" data are deactivated for reduction of the power consumption.

If the stored "checkpoint" data is needed for further operation of the computer node, the present method contemplates the following steps:
sending a "file read" request from the requesting computer node to the buffer node;
transferring the "checkpoint" data to the computer node if the data is available on said non-volatile media memory; and
requesting the storage controller to acquire the "checkpoint" data from the disk drive if the "checkpoint" data is not available in the non-volatile media memory of the buffer node.

These and other objects and advantages of the present invention will be readily available upon reading the following detailed description of the preferred embodiment taken in conjunction with the Drawings Figures.

DESCRIPTION OF THE PREFERRED EMBODIMENTS

Figure 1:
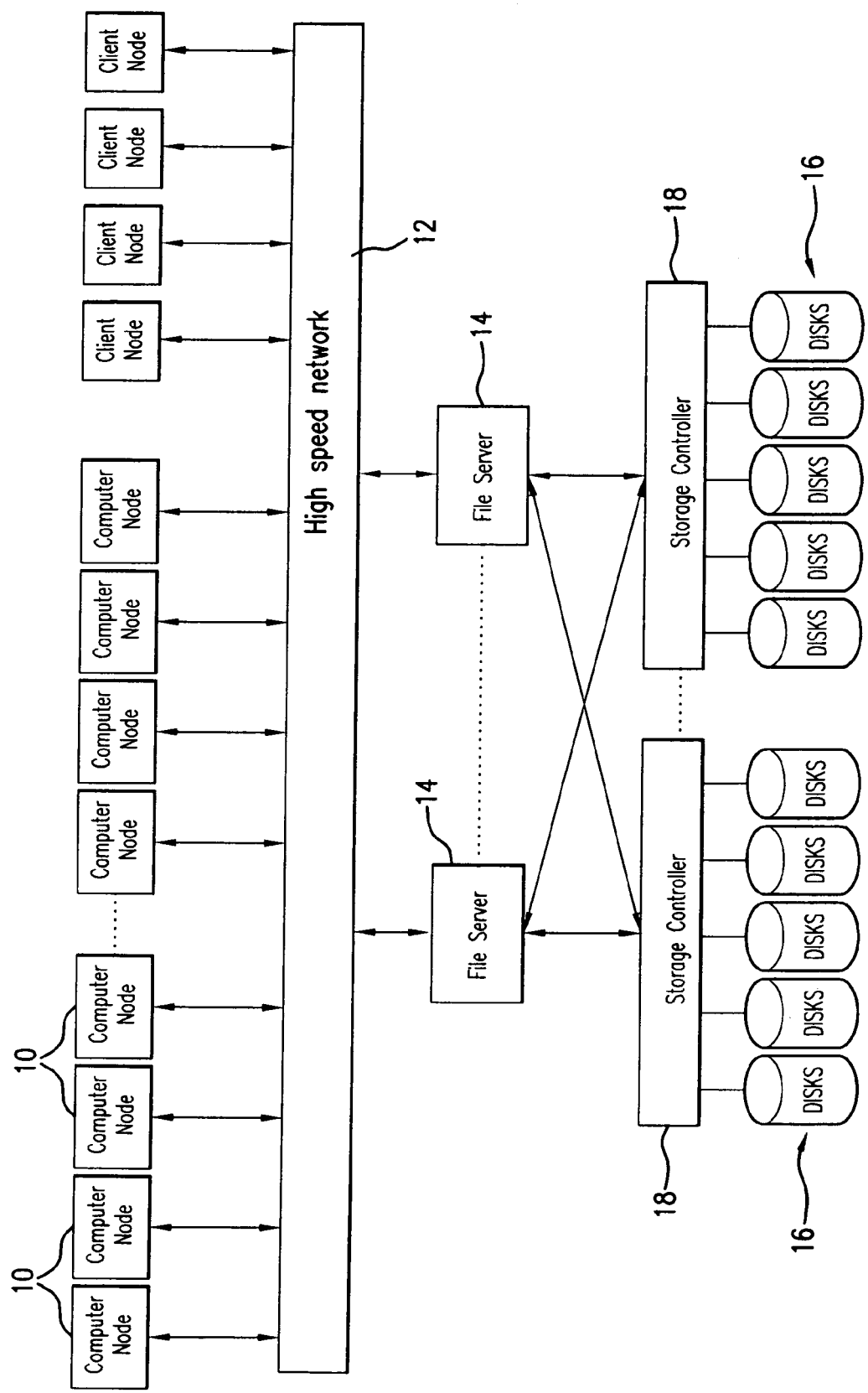
FIG. 1 is a block diagram of the prior art system for data migrating between compute clusters and the storage disk drives.
Figure 2:
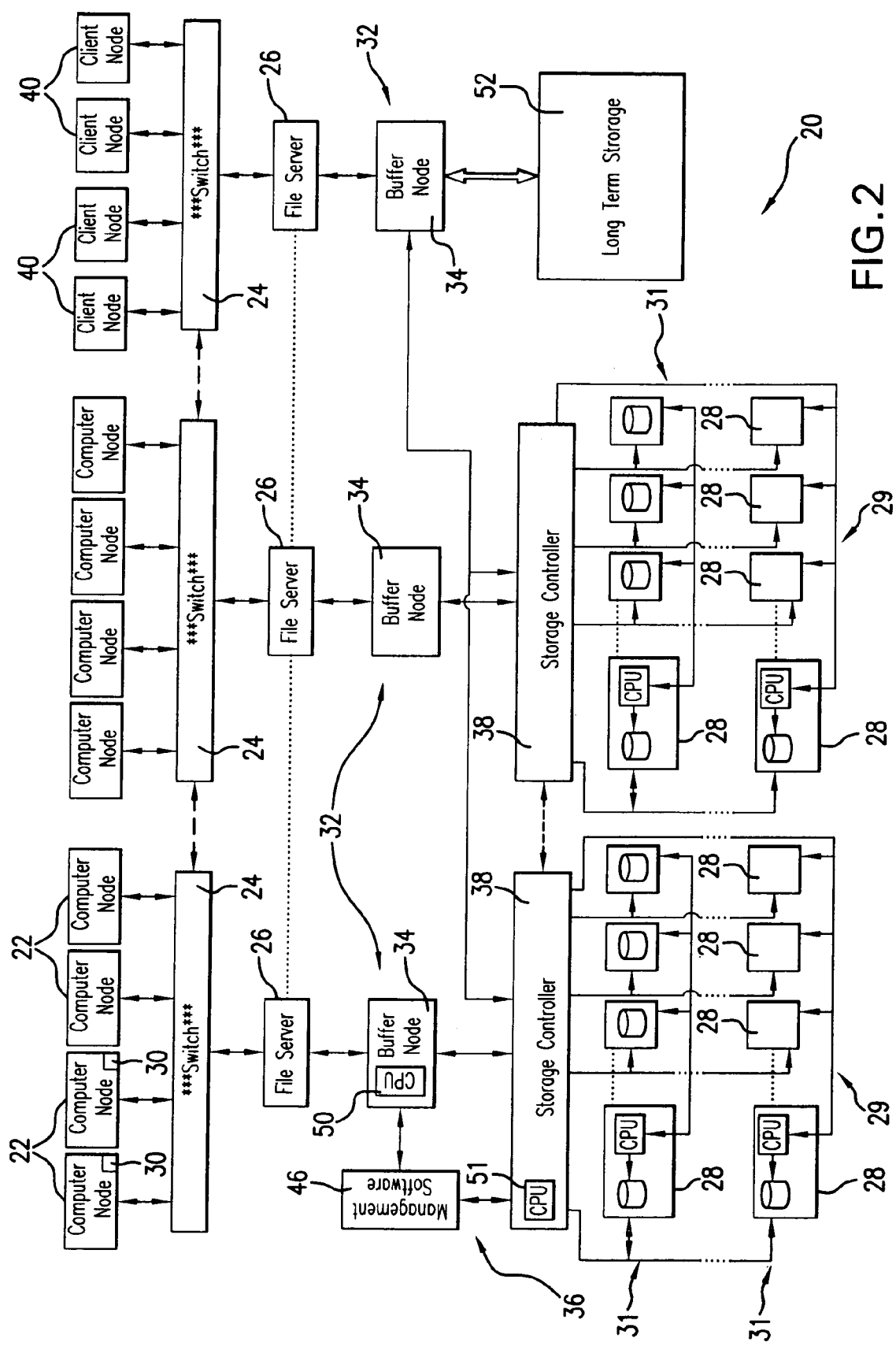
FIG. 2 is a block diagram of the system of the present invention.

Referring to FIG. 2, the system 20 of the present invention includes compute clusters of a plurality of computer nodes 22, also referred to herein as data generating devices. The computer nodes 22 represent any data handling entity attachable to the system 20. The function of the computer nodes depends on the system application. The computer nodes may function as servers, super computing clusters, etc., and have the capacity to "write" by outputting data, as well as "read" from an external memory or any other device.

The computer nodes 22 are interconnected by a high speed network, for example including switches 24, by means of which respective computer nodes are operatively connected to the system 20 either to output data thereto or to read data therefrom. Data migration from and to the computer nodes 22 may be managed by file servers 26 to which the cache of the computer nodes 22 may be written in the I/O cycle of the computer node and which may place the data in a file system for subsequent retrieval.

The system 20 of the present invention is capable of handling any type of data transfer. However, for the sake of simplicity of the disclosure, and as an example only, the following description of the system operation will be presented regarding the "checkpoint" data.

The computer nodes 22 may operate either in I/O cycle (state) when the computing is paused, and in the computing cycle where the computations are executed. The data, for example, "checkpoint" data, are requested from the computer node during the I/O cycles thereof in order to store the "checkpoint" data on the disk drives 28. The stored "checkpoint" data may be retrieved and used if the application software or hardware should fail.

The disk drives 28 may be arrayed in any format. As an example only, but not to limit the scope of the present system, the common type of driver array, e.g., RAID (Redundant Array of independent Drives) is illustrated herein. The RAID storage system 29 is a multi-dimensional array of disk drives 28 distributed in read/write tier groups 31 for storing data and parity values corresponding to the data stored in the array. Each tier group 31 in the array 29 constitutes a multiplicity of data disk storage channels.

Each computer node 22 has a software unit 30 which controls the operation of the computer node for the intended purposes and allocates I/O cycles during the execution of the computer node process for the "checkpoints". The "checkpoint" changes the status of the computer node from the computing mode into the I/O cycle when no actual computation takes place. Since the time of the I/O cycle allocated for the checkpoint is wasted from the overall duty cycle of the computer node, it is preferred that the I/O cycles be kept as short as possible in order to improve the computing duty cycle of the computer node.

The ratio of the computer nodes 22 to the servers 26 may be in excess of 1000 in some applications. The servers 26 file data from multiple computer nodes in a unique location assigned thereto in the overall file system. A plurality of disk drives 28 are provided to store the data from the file servers 26 thereon. The servers 26 satisfy requests of the computer nodes in the order that the requests are received at the server, therefore, the file servers receive data from the computer node 22 in a random fashion.

Disk drives 28 must be spared from random operations, since in randomly granted access, the heads that record the data on the disks have to move over various sectors of the drive, thus taking a great deal of time (seeking time) compared to the actual write or read operation in the system. In the present system, the disk drives are accessed in a sequential manner optimal for the disk drives. The disk drives 28 are provided with the capability of harvesting the data from the buffer node in an orderly manner and in their own time schedule, and therefore the present system avoids the need for a very large number of disk drives for storing the "checkpoint" data required in a random data writing is currently customarily used. Due to this, the excessive power consumption for powering the large amount of disk drives is overcome in the manner presented further herein. Additionally, those disks which do not participate in the data transfers, are deactivated for even further power savings.

The system 20 utilizes an additional (intermediate) data storage layer 32 operatively coupled to the computer nodes 22 through the file servers 26 to enable a more efficient and shorter I/O cycle of the computer nodes operation and to provide orderly data transfer for the data storage layer 32 to the disks 28 independently of the duty cycle of the computer nodes.

Figure 3:
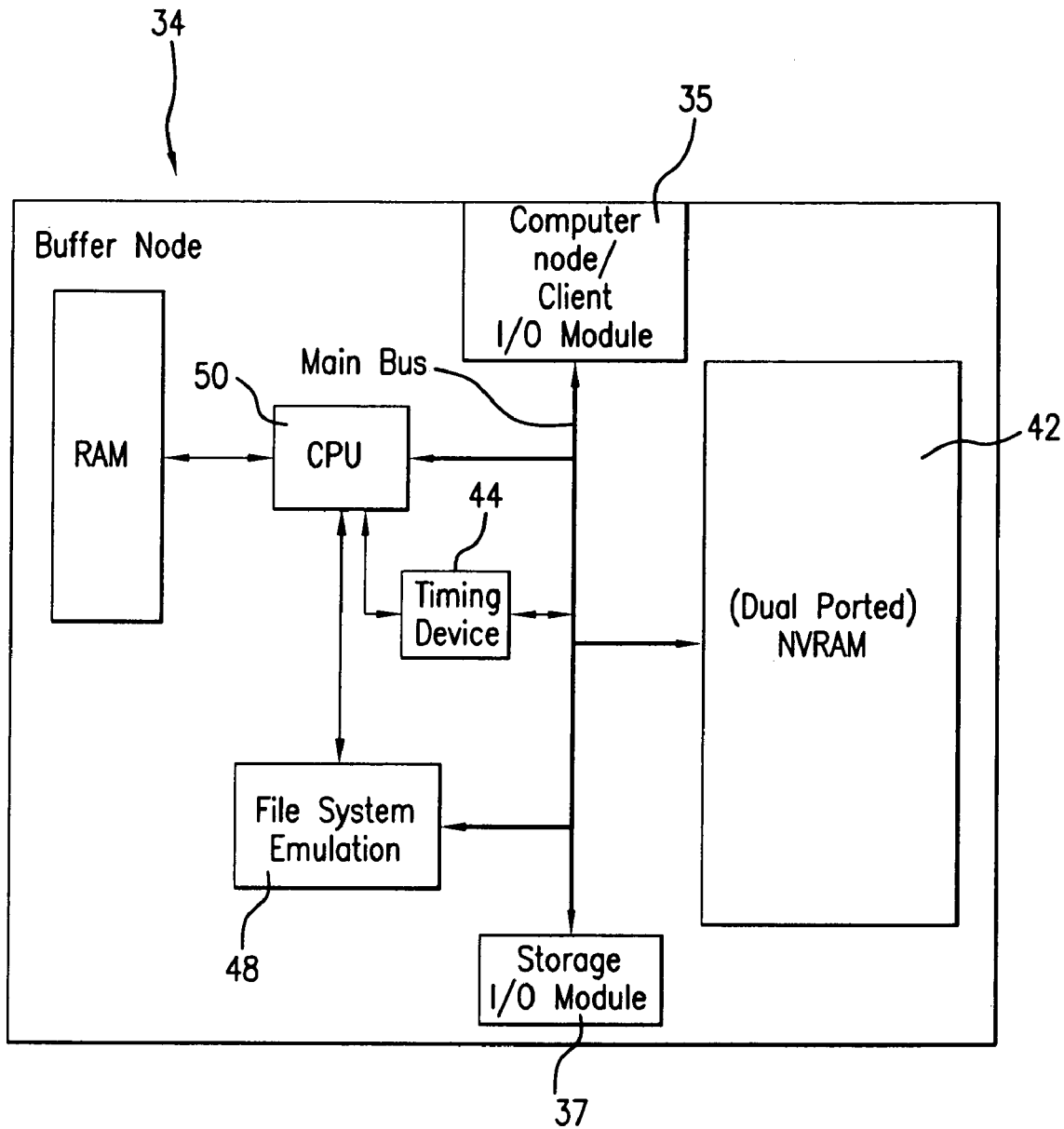
FIG. 3 is a block diagram of the buffer node of the present invention.

The data storage layer 32 includes a buffer node 34, shown in FIG. 3, which acts as a bridge between the highly random I/O activity favored by the computer nodes 22 as well as the file servers 26, and the sequential orderly activity favored by data storage management system 36 coupled between the buffer nodes 34 and the disk arrays 29.

The buffer node 34 has a computer node/client I/O module 35 for interfacing with the computer node 22 (or a client node 40), and/or server 26. The buffer node further has a storage I/O module 37 adapted for interfacing with the storage controller 38. The data storage management system 36 is represented by the storage controllers 38 the function of which, among others, is to periodically harvest the buffer nodes, as well as to hold the data which the computer nodes might request either for themselves or to provide the data to the client node 40 for reading. Both data storage layer 32 and data storage management system 36 are based on a hardware, as well as on management software 46 to enable the efficient operation of the system 20.

The hardware basis presented in FIG. 3 is represented by a non-volatile random access memory (NVRAM) 42 residing on or attached operatively to the file servers 26. This type of memory may be implemented with NAND storage elements, battery backed static memory elements, carbon nanotubes elements, and various other implementations that have the similar characteristic latency for either random or sequential activities. The amount of the non-volatile memory 42 has to be sufficient to store the data from one "checkpoint" of the computer node associated with the specific server 26.

The hardware control system also includes a timing device 44 that may be software enabled to permit the NVRAM system 42 to measure the time since it was last accessed.

The management software 46 underlying the operation of the system 20 of the present invention is shown in FIG. 2 as operatively connected to the buffer node 34 and the storage controller 38 for controlling the interactive operation thereof. Specifically, the management software 46 may be associated with the CPU 50 of the buffer node 34. The storage controller 38 also has a CPU 51 for executing the relevant portion of the management software commands associated therewith.

The management software 46 affects the movement of data from the non-volatile memory 42 to a large pool of disk drives 28 operated by the storage controller 38. This data migration occurs over a separate network formed by the intermediate data storage layer 32 (e.g. buffer nodes 34), in conjunction with data storage management system 36 (storage controllers 38), and the management software 46 so that the network supporting the computer nodes is unaffected by the data migration activity, and the "checkpoint" operation of the computer nodes 22 is executed in the present system without any change to the software running the operation of the computer node. Data output by the computer nodes is captured by the server 26 as a random, multi-threaded activity, but the non-volatile random access memory 42 affords very low latency for the random activity. The entire checkpoint operation is executed relative to the non-volatile random access memory so the subsequent I/O cycle may be significantly shortened since the latency of the disk drives access no longer represent any additional time increment.

The hardware/software timer 44, shown in FIG. 3, measures the time since the last I/O to the NVRAM 42 and a determination may be made regarding the end of the I/O cycle. When the I/O cycle is concluded and the computer node returns to the compute state, data may be copied from the NVRAM 42 to a disk control system, e.g. data storage management system 36, via a high speed network such as Infiniband or Ethernet.

The data written to the disk system is well ordered since the transfer activity is sequential in nature from the element of the non-volatile memory 44 to the disk system 28. The management software 46 schedules the transfer operation to ascertain that the various non-volatile memory transfers will be sequenced to minimize drive seeking operation.

If the "checkpoint" cycle is for example 10%, then the remainder of the overall time may be used for the disk operation that greatly reduces the number of spinning disks required by a high performance simulation environment 22. Power and cooling which are concerns in large cluster environments are positively addressed in the present system by greatly diminishing the infrastructure required for storage attached to clusters.

The system 20 attains an improved duty cycle of the computer nodes, increased effective bandwidth of the disk drives and the minimized power consumption for data migration between the computer nodes 22 and the disk drives 28 by using the intermediate data storage layer (buffer node 34) and data storage management system (storage controller 38) operatively coupled between the file servers 26 and the disk drives 28 to schedule data transfer activity between the buffer node 34 and the disks 28 where the management system 46 appoints a disk drive and determines an optimal sequence of data transfer from the buffer node to the designated disk drive and actuates the data transfer in an optimal sequence.

Referring again to FIG. 3, the buffer node 34 includes the CPU 50 which executes the operation of the buffer node and the storage controller in accordance with the management software 46 affecting both buffer node and the storage controller in accordance with the management software 46 which affects both buffer node and the storage controller.

A File System Emulation Unit 48 is included in the buffer node 34 to aid in requests sorting for harvesting. The buffer node receives the "raw" data from the computer nodes 22. The buffer node uses the internal File System Emulation unit 48 to track the data received from the computer nodes 22. The file system information is used by the storage controllers 38 to sort the requests in order to minimize the access time to the disk drives.

The storage controller 38 works in conjunction with the buffer node 34 to improve bandwidths and reduce latency and power consumption. The buffer node determines when the compute node "write" cycle has finished and determines when the compute node is likely to begin its next 110 write cycle. In between, the buffer node issues a harvest request to the storage controller to fetch the data and store it on the disks. The storage controller sorts and reorders all of the write requests from the buffer node to determine the optimal data transfer sequence.

The storage controller also throttles the read requests from the buffer node based upon which disks the data is being written to. The storage controller manages the transfers to limit the number of disks that are active at any given time. The storage controller and the buffer node thus operate together under the "supervision" of the management software 46 to reduce the power consumption by knowing when the disks are needed for I/O operations and spinning down the unneeded disk, as will be presented further herein.

Figure 4:
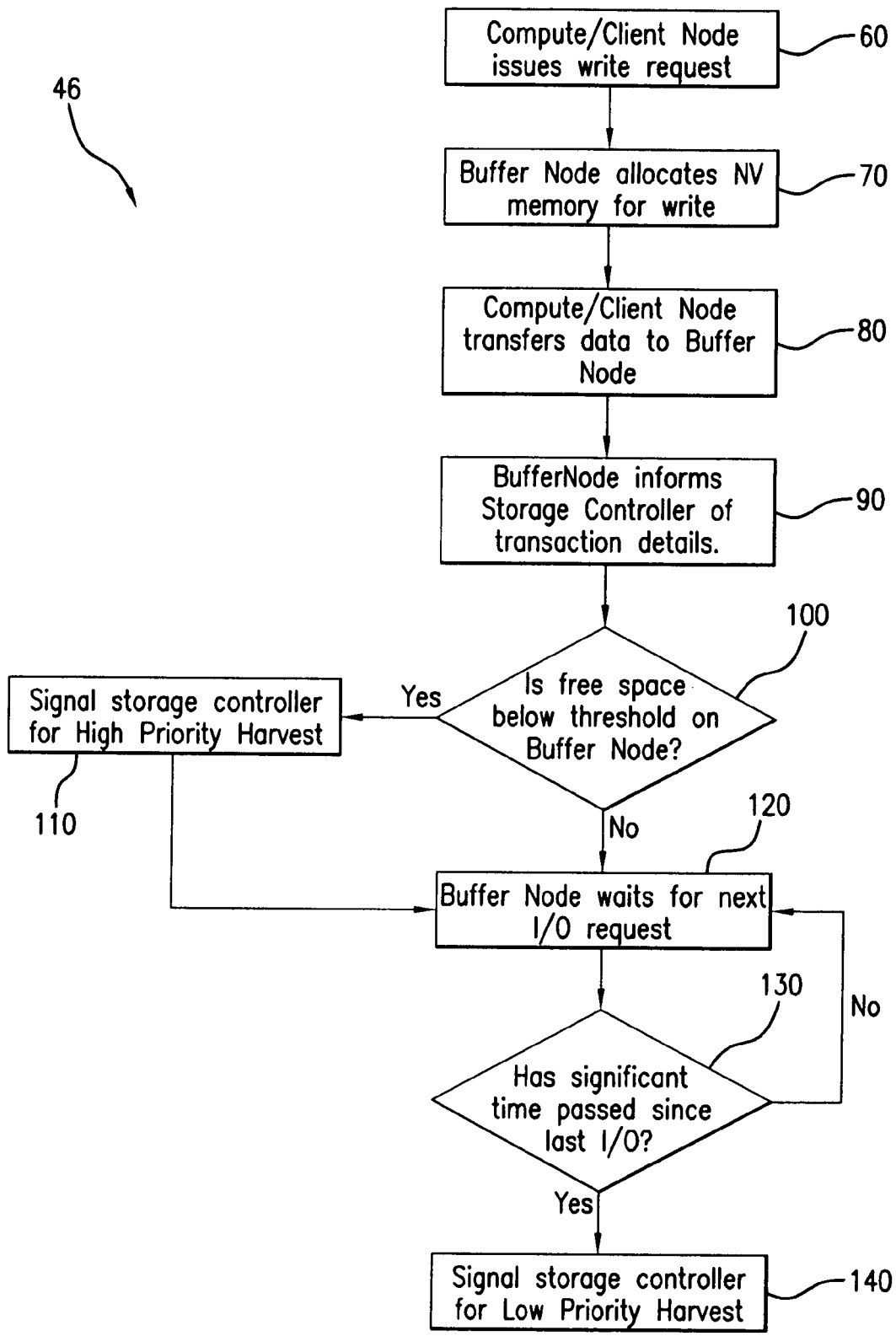
FIG. 4 is a flow chart diagram of the process following the write request issued by the computer node.

Referring to FIG. 4, the subroutine of the management software 46 following the "write" request issued by a computer node 22, is initiated at block 60 "Computer/Client Node Issues Write Request" in which the computer node 22 sends write request to the buffer node 34. Responsive to the request in block 70, the buffer node 34 allocates storage space in the NVRAM 42 and requests the computer node 22 to transfer the data. Responsive to the signal for transferring data, the logic flows to block 80 in which the computer node 22 transfers the data to the buffer node 34. The buffer node places the data into the non-volatile storage space allocated in the NVRAM 42.

Further, the logic flows to block 90 "Buffer Node Informs Storage Controller of Transaction Details", in which the buffer node 34 updates the file descriptors in the File System Emulation unit 48 to indicate that the data is stored in its non-volatile memory 42. The buffer node 34 then sends the "return" signal to the computer node 22 to return the status of the computer node 22 to the computing state.

In block 90, the buffer node also sends "write update" messages to the storage controller 38 for the write request received from the computer node 22. The storage controller 38 records the transactions, but does not begin data transfers. The data is not read from the buffer node 34 until a "harvest" request is sent from the buffer node 34 to the storage controller 38. The buffer node 34 controls the timing of the harvest request.

For issuing the request, the logic flows to the logic block 100 "Is Free Space Below Threshold on Buffer Node?". If the free space remaining in the memory 42 falls below the threshold, the logic flows to block 110 where the buffer node 34 issues a Harvest request of High Priority to the storage controller 38. Upon the signal for High Priority Harvest is sent from the buffer node 34 to the storage controller 38, the logic flows to block 120 where the buffer node waits for next I/O request.

If however, in block 110 the free space remaining in the memory 42 is above the threshold, the flow chart passes to block 120 to wait for the next I/O request.

The buffer node 34 uses the timer device 44 to measure the time since the previous I/O to the non-volatile memory 42 to determine when the computer node 22 has finished its I/O cycle. For this, the logic flows to block 130 "Has Significant Time Passed Since Last I/O?". If significant time passed since the last I/O to the NVRAM 42, the logic flows to block 140 to signal the storage controller 38 for a Low Priority Harvest. If, however, the predetermined time threshold has not elapsed since last I/O, the logic returns to the block 120 to wait for next I/O request.

Figure 5:
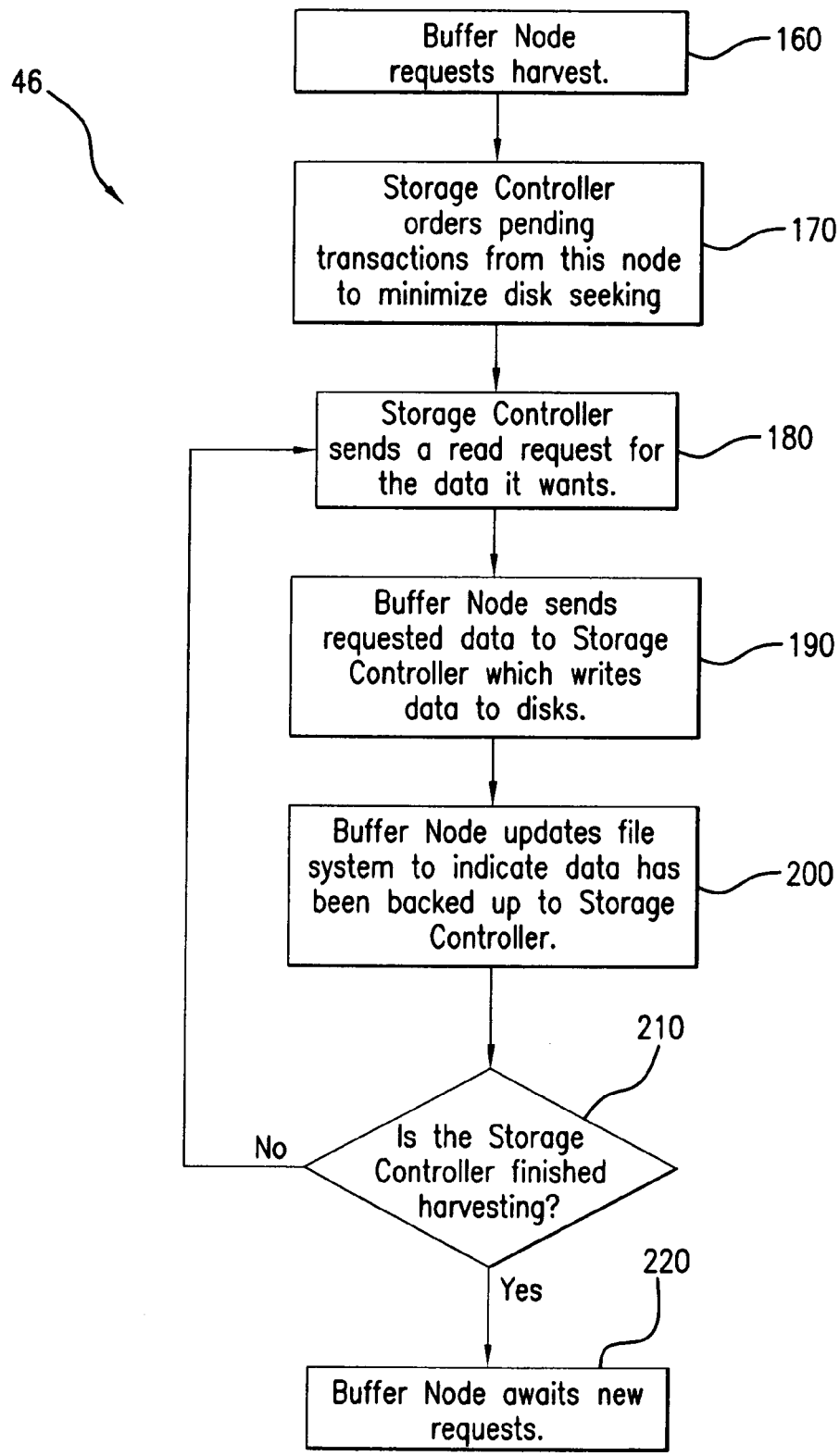
FIG. 5 is a flow chart diagram of the process following the harvest request from the buffer node perspective.

Referring to FIG. 5 showing more in detail the execution of the sub-routine following the harvest request at the buffer node, when the buffer node requests "harvest" in block 160, the logic flows to block 170, where the storage controller which receives the harvest request, begins sorting the pending write transactions list kept in the File System Emulation Unit 48 of the buffer node 34 to minimize the disk seeking time for each disk 28 it controls. Serializing the data transfer is intended for maximizing bandwidths, and for reduction of the latency and power requirements in the system.

When the storage controller 38 produces the optimal order of pending transactions to minimize the disk seeking time, the logic flows to block 180 "Storage Controller Sends a Read Request for the Data it Wants", and the buffer node begins sending the requested data to the storage controller in block 190 so that the storage controller can write data to the disks 28. Further, in block 200, the buffer node updates file system 48 to indicate that data has been backed up to the storage controller. When the storage controller finishes the execution of the "write" request from the buffer node, the buffer node deallocates the non-volatile memory for the data and updates the file system to indicate the data is now stored on the storage controller.

The flow chart further passes to the logic block 210 "Is the Storage Controller Finished Harvesting?". If the harvesting has been finished, the logic flows to block 220 where the buffer node awaits new requests either from the computer node or from the storage controller. If, however, in block 210, the harvesting has not been completed, the logic loops back to the block 180.

Figure 6:
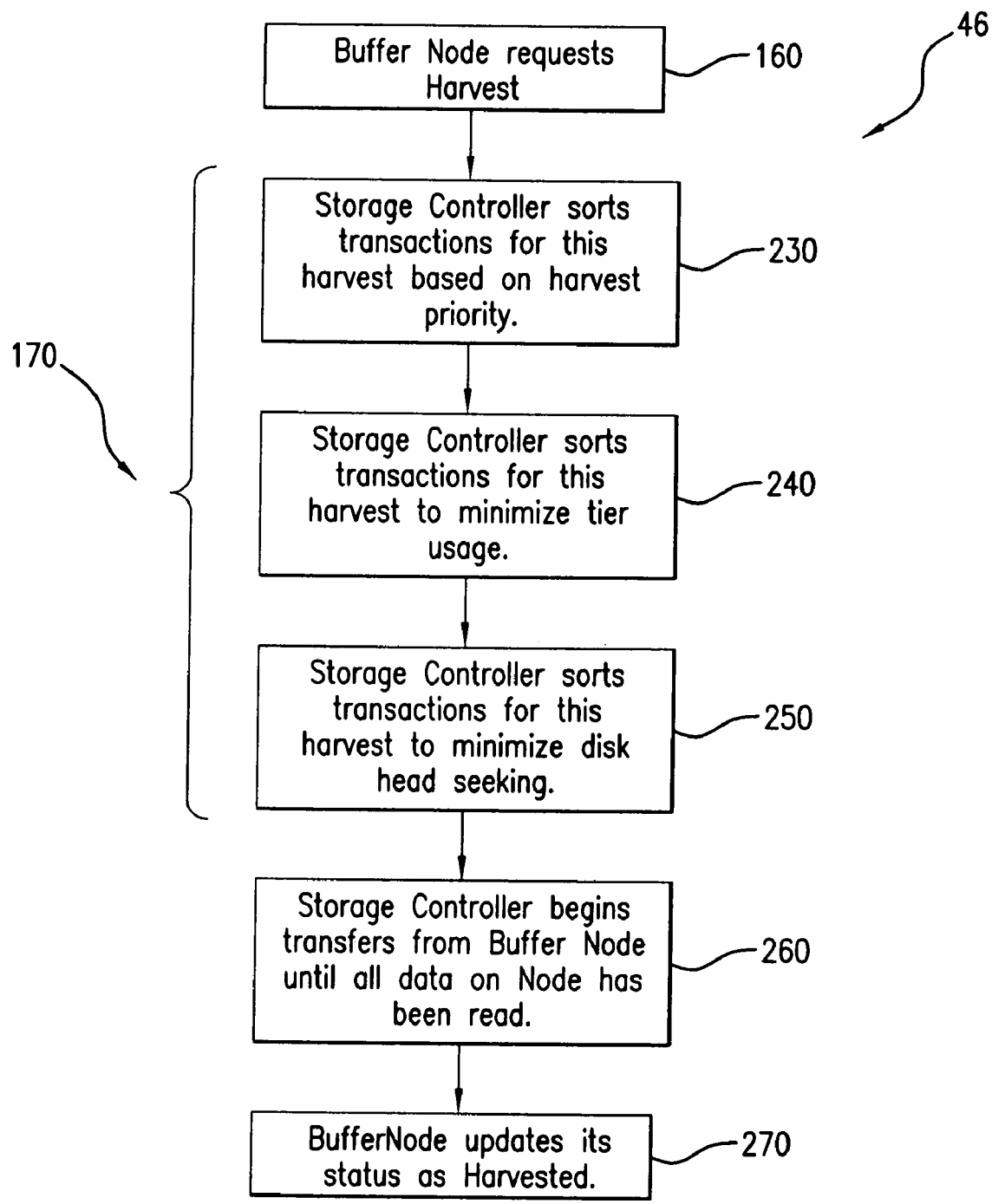
FIG. 6 is a flow chart diagram of the process carried out in the storage controller following the harvest request issued by the buffer node.

FIG. 6 shows a flow chart diagram of the harvest operation from the storage controller perspective. As shown in FIG. 6, the process starts in block 160 "Buffer Node Requests Harvest". Further, in blocks 230, 240, and 250, the storage controller sorts transactions for the harvest request based on harvest priority (block 230), to minimize tier usage, and to minimize disk head seeking.

In block 230, the management logic communicates the signals from blocks 110 and 140 of FIG. 4 to the storage controller for further processing.

In block 240, the storage controller sorts transactions for the harvest to minimize tier usage, e.g., to minimize the access time to a tier parity group 29, shown in FIG. 2, by sorting the logical block addresses of the data sent from the computer nodes. For example, the logical block addresses may be sorted from lowest to highest address. The storage controller operates to minimize access time to the tiers by prioritizing the "write" transfers to the tiers. For example, the tiers may first be sorted by priority, and then by their power state. Fully "spun-up" tiers are considered first, "powered-down" tiers are considered last, and the tiers in the intermediate power states are intermediately considered. Further, the tiers are sorted by the "age" of the data waiting to be written, e.g., the tiers with the "oldest" data waiting are serviced first. Further, in block 250 the storage controller sorts transactions for the harvest to minimize disk head seeking.

Upon sorting transactions based on harvest priority in block 230, tier usage minimization, and disk head seeking minimization in blocks 230-240, the storage controller produces an optimal sequence of the data transfers and begins sending read requests to the buffer node to transfer the data from the non-volatile memory to the disk storage in block 260. When the storage controller finishes reading the data from the NVRAM 42 in the optimized order, the buffer node updates its status as "Harvested" in block 270. The harvest request finishes when the storage controller has finished reading all of the data from the non-volatile storage in the buffer node and storing on the disks as presented in block 260 of FIG. 6 and 210 of FIG. 5.

Returning to FIG. 2, the system 20 includes the client nodes 40 which are similar to computer nodes but are primarily used to read the data from the system through the buffer node. The computer nodes also can write data into the system or into the long-term storage system 52 through the buffer node. The long-term storage 52 is contemplated as a non-volatile storage similar to tape drives that may be used to store data that does not need to be readily accessible but are not to be discarded.

Figure 7:
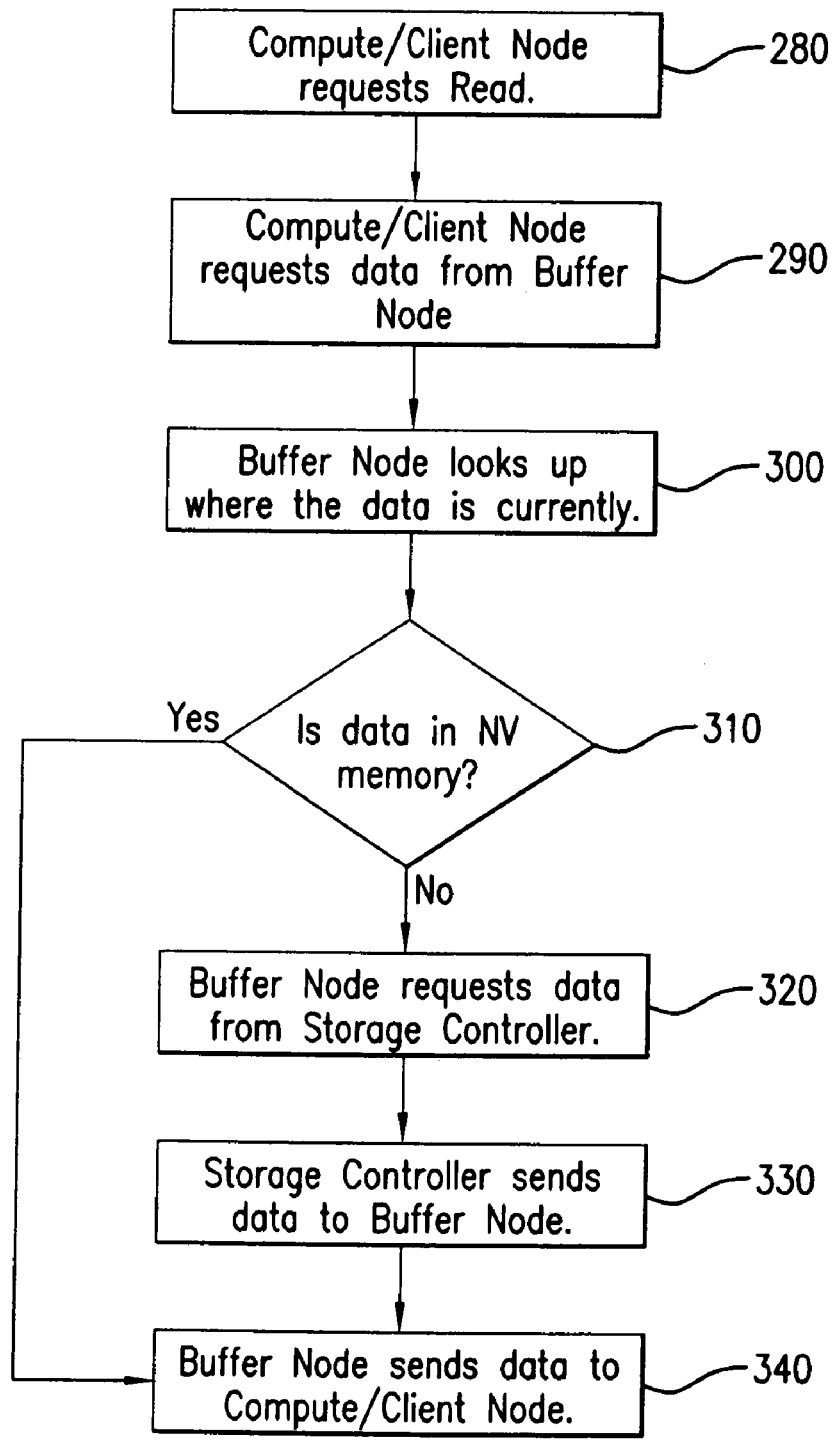
FIG. 7 is a flow chart diagram of a "read" operation performed in the system of the present invention.

Referring to FIG. 7, the computer node may read data back from the buffer node by sending it a "file read" request as presented in block 280. Responsive to the "file read" request, the computer node modifies the request to read data from the buffer node in block 290. Further, the logic flows to block 300 "Buffer Node Looks Up Where The Data is Currently" in which the buffer node examines the file descriptor in the file system emulation unit 48 to determine where the data is located.

The logic flows to logic block 310 "Is Data in NV Memory?". If the buffer node finds the requested data in the memory, the logic flows to block 350 so that the buffer node can transfer data from the non-volatile memory if the buffer node still stores it. If, however, in block 310, it is determined that the buffer node is no longer storing the data, then the request is made in block 320 to the storage controller to read the data and to send it back to the buffer node. Responsive to this procedure, the flow-chart passes to block 330 where the storage controller finds the requested data and sends data to the buffer node. From the buffer node, the data is transferred to the computer node in block 340.

The client node 40 may read the file information from the buffer node. The buffer node indicates where the data is currently located, and the client node will read directly from the buffer node if the data is still located in the buffer node's non-volatile memory. Otherwise, the client node reads the data from the storage controller similarly to the procedure in FIG. 7.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:

1. A system with an improved duty cycle, increased effective bandwidth, and minimized power consumption for data migration between a data generating entity and a plurality of data storage units, the system comprising:
    an intermediate data storage layer operatively coupled to said data generating entity to store data received therefrom in a random manner,
    a data storage management unit operatively coupled between said intermediate data storage layer and said plurality of data storage units; and a management controlling unit operatively coupled to said intermediate data storage layer and said data storage management unit to control interactive operation thereof and to perform data transfer between said intermediate data storage layer and a designated at least one data storage unit in an orderly manner based on predetermined conditions of said intermediate data storage layer and said plurality of data storage units.

2. The system of claim 1, wherein said predetermined conditions are selected from a group consisting of: fullness of said intermediate data storage layer, time since a previous data transfer thereto, priority of harvesting said data from said intermediate data storage layer, minimization of usage of tiers of said plurality of data storage units, and minimization of seeking time for each data storage unit.

3. The system of claim 1, wherein said data generating entity is a compute cluster including a plurality of computer nodes interconnected therebetween, each of said computer nodes operating intermittently in a computing mode or an I/O (input/output) mode,
    wherein said data is transferred to said intermediate data storage layer from a respective one of said plurality of computer nodes responsive to a "transfer" command issued by said intermediate data storage layer in response to a "write" request issued by said respective computer node, if said intermediate data storage layer allocates a storage space thereat for said data.

4. The system of claim 3, wherein said data includes "checkpoint" data transferred from said plurality of computer nodes in said I/O mode thereof to be stored in said data storage units.

5. The system of claim 3, wherein said intermediate data storage layer comprises at least one buffer node including a non-volatile random access memory (NVRAM), and a processing unit coupled to said NVRAM and running an operation of said at least one buffer node.

6. The system of claim 5, wherein said NVRAM includes a memory selected from a group consisting of: NAND storage elements, battery backed static memory elements, and carbon nanotube memory.

7. The system of claim 5, wherein said at least one buffer node actuates switching of said respective computer node from said I/O mode to said computing mode thereof upon said data has been stored in said NVRAM.

8. The system of claim 5, wherein said at least one buffer node maintains a file system unit including an address of a specific file in said NVRAM, wherein said at least one buffer node updates said file system unit upon said data has been stored in said NVRAM.

9. The system of claim 5, wherein said at least one buffer node includes a timer unit to determine an elapsed time since the last input to or output from said NVRAM.

10. The system of claim 9, wherein said timer determines the end of a previous I/O mode of said respective computer node, and determining a beginning of a next I/O mode thereof.

11. The system of claim 5, wherein said data storage management system includes at least one storage controller coupled to said at least one buffer node to harvest data stored therein in a controlled manner, and wherein said at least one buffer node controls the timing of each harvest request.

12. The system of claim 11, wherein said at least one storage controller includes a processing unit coupled to said management controlling unit and executing an operation of said at least one storage controller according thereto.

13. The system of claim 11, wherein said at least one storage controller selectively throttles harvest for said at least one buffer node to limit concurrent access to said plurality of data storage units.

14. The system of claim 11, wherein said at least one buffer node communicates "write update" messages to said at least one storage controller when the "write" request is received from said respective computer node, and wherein said data transfer from said at least one buffer node is deactivated until receipt of a "harvest" request issued by said at least one buffer node to said at least one storage controller.

15. The system of claim 14, wherein upon the receipt of said harvest request, said at least one storage controller initiates a sorting operation of "write update" messages received from said at least one buffer node, generates an optimal sequence of operation data transfers, and sends corresponding "read" requests to said at least one buffer node to transfer said data from said NVRAM to said at least one designated data storage unit.

16. The system of claim 15, wherein said at least one storage controller deactivates data storage units unneeded for data transactions.

17. The system of claim 15, wherein said at least one storage controller sorts said "write update" messages based on harvest need priority.

18. The system of claim 11, wherein said at least one buffer node issues a harvest request to said at least one storage controller, when a remaining space in said NVRAM reaches a predetermined minimal level.

19. The system of claim 11, wherein said at least one buffer node issues a harvest request to said at least one storage controller when a predetermined time elapsed since a previous harvest.

20. The system of claim 5, wherein said respective computer node generates a "file read" request to said at least one buffer node to read said data from said NVRAM, and wherein said at least one buffer node transfers said data to said respective computer node if the data remains in said NVRAM, otherwise said at least one buffer node requests said at least one storage controller to acquire said data from said at least one designated data storage unit and send said data to said at least one buffer node.

21. The system of claim 5, wherein said NVRAM of said at least one buffer node is dual ported.

22. The system of claim 1, wherein said at least one designated data storage unit is selected based on minimizing disk seeking time.

23. The system of claim 1, further comprising a long term storage device coupled to said intermediate data storage layer.

24. A system for writing "checkpoint" data from high performance computer nodes to disk storage devices, the system comprising:
 a data migrating network operatively coupled between said high performance computer nodes and said disk storage devices, wherein said data migrating network includes:
  at least one buffer node coupled to said high performance computer nodes and having a non-volatile non-rotating media memory,
  at least one storage controller connected to said at least one buffer node and said disk storage devices;
 wherein said at least one buffer node stores in said non-volatile media memory thereof said "checkpoint" data received from a respective computer node, and generates a "harvest" request responsive thereof, and
 wherein said at least one storage controller sorts a list of said "checkpoint" data stored in said at least one buffer node responsive to each said "harvest" request to generate an optimal sequence of data transfers,
 harvests said "checkpoint" data from said at least one buffer node according to said sorted list, and
 writes said "checkpoint" data to at least one respective data storage device in accordance with said optimal sequence of data transfers.

25. The system of claim 24, wherein said "checkpoint" data is harvested from said at least one buffer node responsive to an event selected from a group consisting of:
 a predetermined time having elapsed since a previous harvest, and a free space on said non-volatile non-rotating media memory falling below a predetermined threshold.

26. The system of claim 24, wherein said non-volatile non-rotating media memory is selected from a group consisting of: NAND flash memory, battery backed random access memory, and carbon nanotube memory.

27. The system of claim 24, wherein said at least one buffer node maintains a file descriptor including a location of a specific file.

28. The system of claim 24, wherein said at least one buffer node maintains a timer to determine an elapsed time since a last input or output to said non-volatile non-rotating media memory.

29. The system of claim 24, wherein said at least one storage controller selectively throttles harvest from said at least one buffer node to limit concurrent access to disks of said plurality of disk storage devices.

30. The system of claim 29, wherein said disk storage devices which are not necessary to writing said sorted list of "checkpoint" data are deactivated.

31. A method for data transfer between data generating entity and a plurality of data storage devices, comprising the steps of:
 (a) operatively coupling at least one buffer node to said data generating entity, and operatively connecting at least one storage controller between said at least one buffer node and the data storage devices;
 (b) sending "checkpoint" data from the data generating entity to said at least one buffer node during an I/O cycle of said data generating entity;
 (c) signaling said at least one storage controller that said at least one buffer node has said "checkpoint" data stored in a non-volatile media memory thereof;
 (d) sending a harvest request from said at least one buffer node to said at least one storage controller;
 (e) maintaining a list of "checkpoint" data stored on said at least one buffer node;
 (f) sorting said list of "checkpoint" data for writing said "checkpoint" data to said data storage devices in an optimal data transfer sequence;
 (g) periodically harvesting said "checkpoint" data from said at least one buffer node according to said sorted list; and
 (h) sequentially writing said "checkpoint" data to a designated at least one said data storage devices in said optimal sequence.

32. The method of claim 31, further comprising the steps of:
 in said step (g), harvesting said "checkpoint" data from said at least one buffer node in accordance to:
  a predetermined time having elapsed since a previous harvest, or
  a free space on said non-volatile media memory in said at least one buffer node falling below a predetermined threshold.

33. The method of claim 31, further comprising the step of: selecting said non-volatile media memory from a group consisting of: NAND flash memory, battery backed random access memory, and carbon nanotube memory.

34. The method of claim 31, further comprising the steps of: prior to said step (b),
(i) issuing a "write" request by said data generating entity to said at least one buffer node,
(j) searching for a storage space in said non-volatile media memory for said "checkpoint" data, and
(k) generating a "transfer" command at said at least one buffer node responsive to said "write" request if said storage space has been allocated.

35. The method of claim 34, further comprising the steps of: after said step (c), issuing a "return" signal at said at least one buffer node to cease said I/O cycle and to switch said data generating entity from said I/O cycle to a computing state thereof.

36. The method of claim 31, further comprising the step of: after said step (c), updating a file descriptor maintained in said at least one buffer node.

37. The method of claim 31, further comprising the step of: in said step (h), deactivating data storage devices which are not needed for the storing of said "checkpoint" data.

38. The method of claim 31, further comprising the steps of: after said step (h),
(l) sending a "file read" request from said data generating entity to said at least one buffer node,
(m) transferring said "checkpoint" data to said data generating entity if available on said non-volatile media memory and
(n) requesting said at least one storage controller to acquire said "checkpoint" data from said data storage devices if said "checkpoint" data is not available in said non-volatile media memory.

39. The method of claim 31, further comprising the steps of:
in said step (f), determining said optimal sequence based on harvest priority, minimal tier usage, and minimal disk head seeking time.

* * * * *